Oct. 6, 1970  A. H. YOUMANS ET AL  3,532,885
METHOD AND APPARATUS FOR NEUTRON LIFETIME WELL LOGGING USING
DUAL DISCRIMINATION WITHIN ONE OF TWO INTERVALS
Filed May 31, 1967  4 Sheets-Sheet 1

ARTHUR H. YOUMANS
ERIC C. HOPKINSON
 INVENTORS.

BY William E. Johnson Jr
 ATTORNEY.

ARTHUR H. YOUMANS
ERIC C. HOPKINSON
*INVENTORS.*

BY William E. Johnson Jr
*ATTORNEY.*

United States Patent Office 3,532,885
Patented Oct. 6, 1970

3,532,885
METHOD AND APPARATUS FOR NEUTRON LIFE-TIME WELL LOGGING USING DUAL DISCRIMINATION WITHIN ONE OF TWO INTERVALS
Arthur H. Youmans and Eric C. Hopkinson, Houston, Tex., assignors to Dresser Industries, Inc., Dallas, Tex., a corporation of Delaware
Filed May 31, 1967, Ser. No. 642,476
Int. Cl. G01v 5/00
U.S. Cl. 250—83.3   12 Claims

ABSTRACT OF THE DISCLOSURE

Pulse height discrimination is used to provide a plurality of ranges within one measurement taken during the logging of the decline of the thermal neutron population to provide spectral information.

BACKGROUND OF THE INVENTION

This invention relates to the art of geophysical prospecting in general and to the art of radioactivity well logging in particular and more particularly to improvements in such logging wherein the lifetime of neutrons in the formation is measured.

Radioactivity well logging is conventionally of three sorts, natural gamma ray logging, gamma ray-gamma ray logging, and neutron logging. Neutron well logging is conventionally performed by traversing a well with a radium-beryllium source of energetic neutrons, thereby continuously irradiating the formations penetrated by the well with fast neutrons, and simultaneously measuring and recording the number of neutrons or gamma rays returning to the well from the formations as a result of such irradiaiton.

An improvement in neutron well logging as shown in the prior art utilizes a periodically varying neutron source whereby the neutron irradiation of the formations is periodically cut off. Such a source may comprise a system employing a material emitting alpha particles together with a disk rotating beside it having alternate sectors made of material which emits neutrons when exposed to alpha particles. The disk is rotated to turn the neutron source off and on at an audio frequency. A continuously operating detector detects secondary radiation emitted from the formations as a result of the radiations, and the audio-frequency component in the detection signal is amplified and recorded to the exclusion of any constant tection signal related to the natural gamma radiation. In the instant invention, not only the neutron source but also the detecting system is periodically varied.

It is known in the prior art to irradiate the formations for a period of time sufficient to activate an appreciable number of nuclei of material in the formations, thereby rendering the material artificially radioactive, and at an interval of the time following the cessation of irradiation to measure this artificial radioactivity. The time is related to the half life of the activated material and is of the order of minutes or seconds for such of the common elements of the earth as are activated appreciably by this means. This may be accomplished by causing the source to be turned on and off at a frequency related to half life and detecting continuously; or the detector may follow a continuously emitting neutron source through the well at such spacing and rate as to cause the detector to arrive at a particular point in the well a predetermined interval after irradiation. In the instant invention, the period of the periodically varying source and detector system is related not to the half life of the irradiated material but to the lifetime of the neutrons in the formations, that is, to the time needed for fast neutrons emitted from the source to be slowed and captured. This time is of the order of hundreds of microseconds in ordinary earth formations.

In the copending application of Arthur H. Youmans Ser. No. 292,927, now U.S. Pat. No. 3,379,882, issued Apr. 23, 1968, assigned to the assignee of the present invention, there is described a system for radioactivity well logging wherein the formations are irradiated with neutrons from a periodically varying source operating at a repetition rate of the order of magnitude of hundreds or thousands of cycles per second, being thus alternately on and off for periods of hundreds of microseconds. A detecting system is synchronized with the source to operate while the source is off. The radiation detected may be either slow neutrons or gamma rays which result from thermal neutron capture; in either case the signal is related to the population of thermal neutrons in the formation surrounding the borehole. From the time the source is turned off, the slow neutrons are gradually captured and the amount of radiation detected per unit time decreases until the source is again turned on. By measuring the number of thermal neutrons (or gamma rays produced by the thermal neutrons) present at any particular time, the ray of decay of the thermal neutron population may be measured. The rate of decay is dependent upon the nuclei of the material present in the formations and varies from formation to formation. This rate of decay is related to the time required for those nuclei to capture the thermal neutrons; therefore, in the system described therein, the measurement is related to this time and hence to the lifetime of the neutrons in the formations. The radioactivitiy well log which is normally conducted according to the radioactivity well logging system described in said copending application comprises a pair of counting rate curves plus a curve indicative of the rate of decline of the neutron population which is a function of the ratio of the two counting rate curves. The early gate, or $N_1$, curve is in present commercial operation normally derived during the interval of 400 to 600 microseconds after time zero; that is, it is a measure of the radiation intensity detected during the interval from 400 to 600 microseconds after the termination of the neutron pulse from the neutron source. The late gate, or $N_2$ curve is a similar measurement derived during the interval from 700 to 900 microseconds after time zero. The present invention relates to an improvement upon the system as described in said copending application and as such comprises, broadly, a pair of pulse height discriminators included in the first measurement means, which produces the $N_1$ curve, and means for normalizing the two respective curves resulting from the two measurements produced by the pulse height discriminators, thereby providing an improved well logging operation.

In one aspect of the invention, the two curves are normalized to fall substantially together in zones of a predetermined character, e.g., oil bearing zones. After the curves are thus normalized, they are relatively similar in character and generally track near one another throughout an entire logging operation. The curves so normalized find special utility in noting relative variations. Thus, as will be described hereinafter variations in the relative hydrogen-to-chlorine ratio or boron-to-hydrogen ratio can be observed and are especially helpful in the interpretation of logs relating to the decline of the thermal neutron population, since such information is capable of corroborating by independent means the variations in the oil-water ratios normally difficult or impossible to infer from the standard radioactivity logs. Another feature of the invention relates to providing a measurement of the ratio of the outputs of the two pulse height discriminators.

Therefore, the principal object of this invention is to provide an improved method and apparatus for determining geophysical characteristics of formations about a borehole;

It is a further object of this invention to provide an improved method and apparatus for neutron well logging based on the lifetime of neutrons in the formations;

It is yet another object of the invention to provide a method and apparatus having a pair of pulse height discriminators within at least one of the gated intervals in the detection portion of a radioactivity well logging system;

It is still another object of the invention to provide measuring means indicative of the ratio of the outputs of said pulse height discriminators.

Other objects, features and advantages of the invention will become apparent from the following detailed descriptions, when considered with the accompanying drawings, in which.

Figure 4:
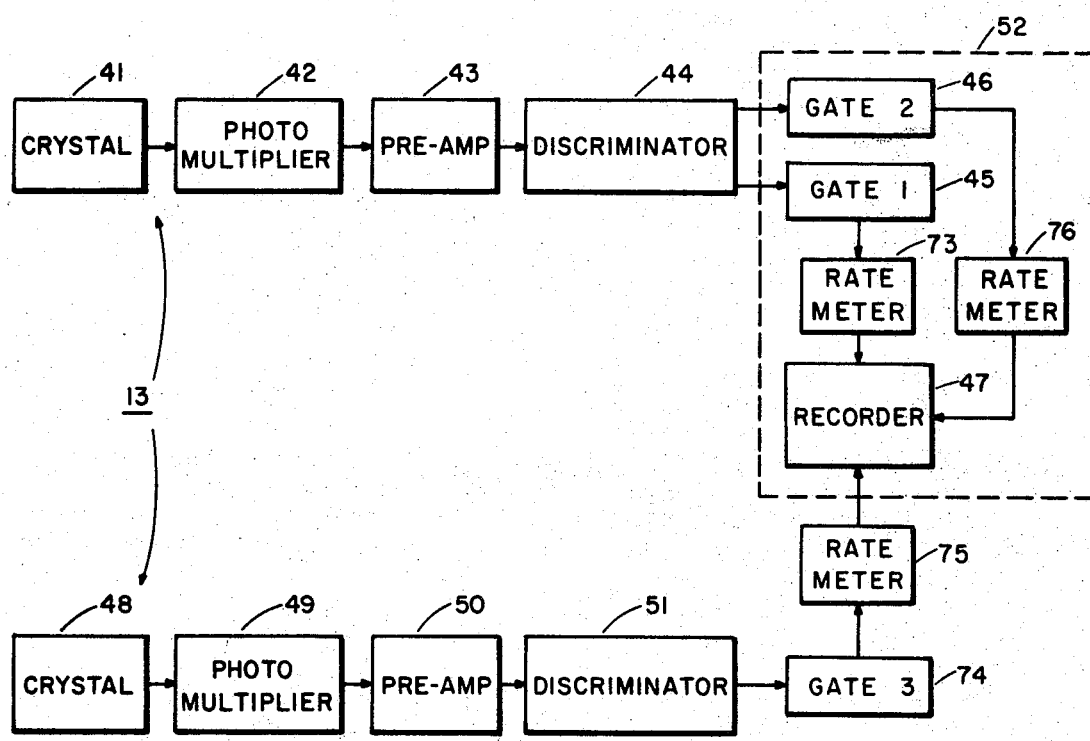
Figure 5:
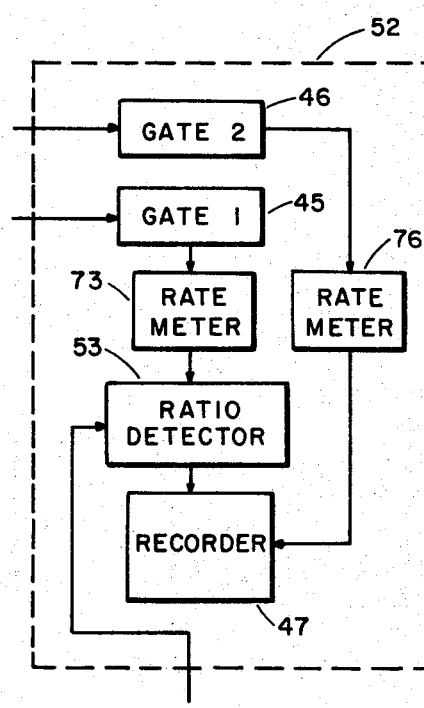
Figure 6:
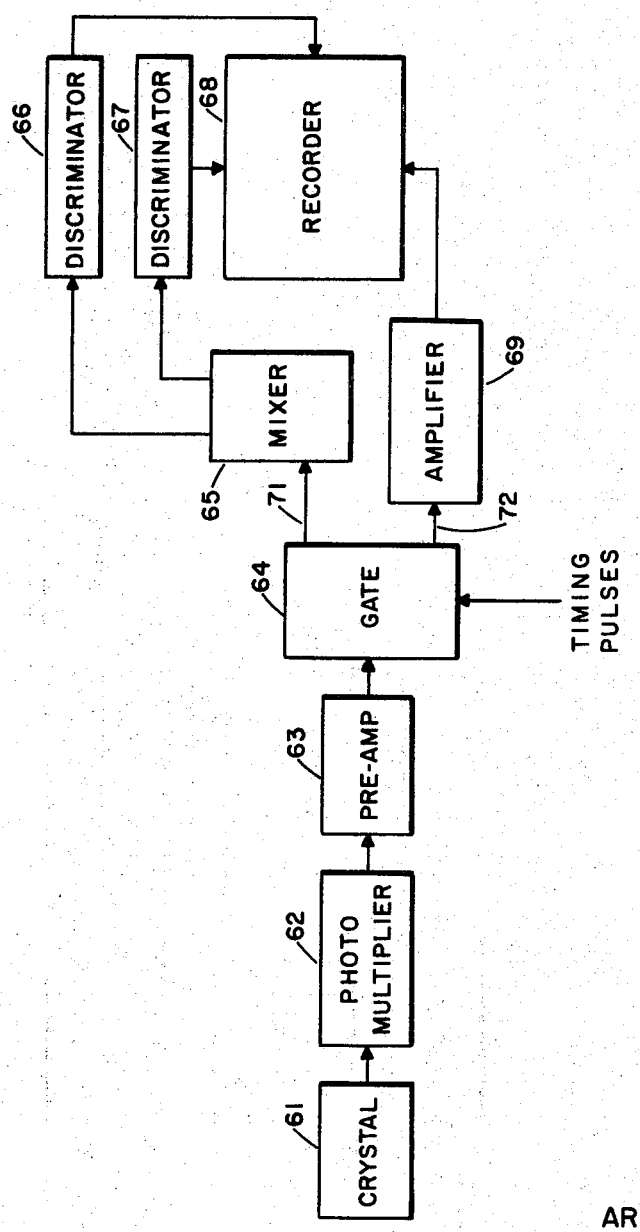

FIG. 3a and b, respectively, represent a side elevational view in section of representative strata to be examined and curves produced by the method and apparatus according to the invention which are indicative of such strata;

FIG. 4 is a block diagram of circuitry according to one embodiment of the invention;

FIG. 5 is a block diagram of an alternative embodiment of circuitry according to the invention; and FIG. 6 is a block diagram of an alternative embodiment of circuitry according to the invention.

Figure 1:
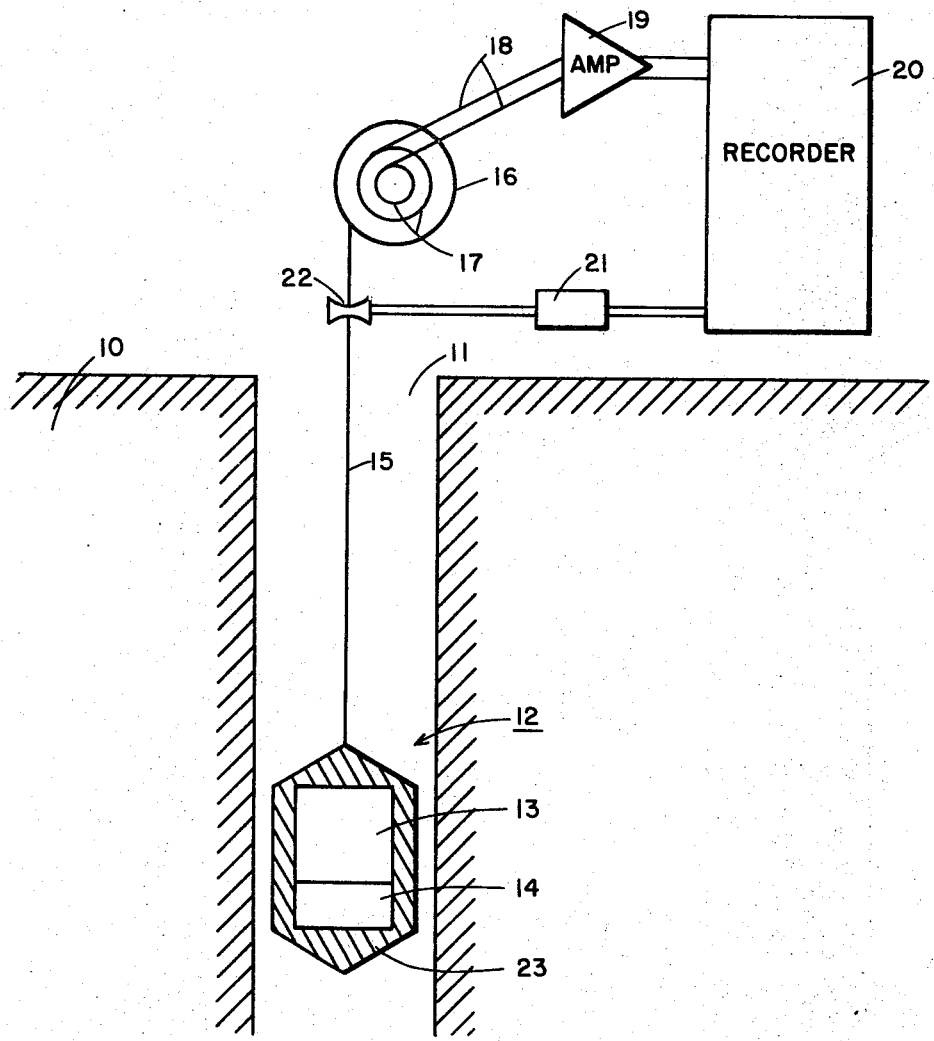
FIG. 1 is a side elevational view partly in section illustrating apparatus which may be used to carry out the invention, and the disposition of such apparatus relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface and may or may not be cased. Disposed within the well is subsurface instrumeunt 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on, or unwound from, drum 16 in raising and lowering the instrument 12 to traverse the well.

In making a radioactivity log of a well, instrument 12 is caused to traverse the well. Thereby neutrons from source 14 irradiate the formations surrounding the borehole, and radiations influenced by the formations are detected by detecting system 13. The resultant signal is sent to the surface through cable 15. Through slip rings and brushes 17 on the end of the drum 16, the signals are conducted by lines 18 to the amplifier 19 for amplification. The amplified signals are conducted to recorder 20 and recorded. Recorder 20 is driven through a transmission 21 by measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well and provides adequate space within it to house the necessary apparatus and to permit the transmission of radiation through it.

As is well known in the art of radioactivity well logging, the formation 10 is irradiated by neutrons exiting from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detector 13.

In the art of radioactivity well logging, it may be broadly stated that when a formation is irradiated with fast neutrons, the neutrons will penetrate more or less deeply into the formation, and will interact with the formation nuclei in a variety of ways. The kind of reaction produced by a collision will depend upon several factors, not the least of which is chance. However, the factors which are most important in well logging operations are the speed of the bombarding neutron, and the type of nucleus bombarded. During its lifetime, a particular neutron may be expected to collide with one or more formation nuclei, and to lose some of its energy in each such collision. After the neutron is slowed to thermal energy, the neutron may be expected to be promptly captured and thus disappear.

When a fast neutron strikes a formation nucleus, any one of many different types of nuclear reactions may occur, and the probability that a particular type of reaction will occur depends upon the speed of the bombarding neutron and the character of the struck nucleus. A given type of nucleus will produce only certain reactions. Furthermore, certain reactions will only occur if a particular type of nucleus is struck by a neutron having at least a minimal speed. Thus, very high energy, for example 14 mev. neutrons from a D-T accelerator, will produce a great variety of nuclear reactions, depending upon the character of the nuclei bombarded. Furthermore, a fast neutron may enter into one type of nuclear reaction early in life, and after being slowed, create different additional reactions when colliding at a lower energy with nuclei of the same type. Nevertheless, certain reactions are well known to greatly predominate, and unless otherwise specified, all other reactions are generally ignored for commercial well logging purposes.

The three types of fast neutron reactions which predominately occur where earth's substances are irradiated, are elastic scattering, inelastic scattering, and so-called "activation" reactions. In the case of both elastic and inelastic scattering, the bombarding neutron is redirected off in a new direction after suffering a loss of energy, and the extent of such loss is substantially a function of the character of the struck nucleus. The most significant difference between these two types of scattering reactions is the fact that elastic scattering does not produce any secondary radiation, whereas an inelastic scattering reaction instantaneously produces one or more gamma rays as a result of the collision. In the case of "activation," the bombarding neutron transmutes the struck nucleus into an unstable isotope which more or less promptly "decays" to a stable state. During its unstable state, however, the transmuted nucleus emits gamma rays in number and energy, and for an interval, according to the character of the nucleus. The "half lives" of many such unstable isotopes have been carefully measured or computed and "activation analysis" is useful for determining the composition of an unknown material. Although "activation' has hereinbefore been referred to as a fast neutron reaction, this is not entirely accurate, since some nuclei, for example aluminum and sodium, can be activated with neutrons of only thermal energy. Generally, any activation reaction is strictly a threshold type of reaction; i.e., only a neutron having at least a minimum amount of energy can produce a particular reaction. However, when a D-T accelerator is used, many different "activation" reactions will be produced in earth's substances since the thresholds of most known activation reactions are well below the initial energy of a D-T neutron.

After a fast neutron has been slowed by one or more of the aforementioned types of reactions, and has been reduced to thermal energy, it is generally captured within a short time. A capture reaction will instantaneously produce one or more gamma rays having a number and energy directly related to the character of the capturing nucleus. However, the energy and number of gamma rays produced by an inelastic scattering reaction is generally not the same as that of gamma radiation produced by a capture reaction, even if the same type of nucleus is involved. Thus, capture gamma radiation may be distinguished by spectral analysis from inelastic scattering gamma radiation. The terms "fast," "slow," "epithermal" and "thermal" are commonly used throughout the well logging industry to indicate generally the speeds or energy of neutrons. Although such classification is clearly aribtrary, it is generally understood that a "fast" neutron is one which is traveling at a speed greater than 1 mev., and a "slow" neutron is one which is traveling at less than 1 mev. The term "thermal neutron" is almost universally used to indicate neutrons which are traveling at an average speed of about 2200 meters per second, corresponding to an energy of 0.025 ev.; the term "epithermal" is generally applied to neutrons traveling at an energy above thermal, particularly within the range 100 ev. to to 0.025 ev. Unless otherwise defined, the terms "fast," "slow," etc. may be assumed to have the foregoing meaning.

It is well known in well logging that a fast neutron may proceed in any direction after undergoing either elastic or inelastic scattering in the formation. Thus, most of the scattered neutrons will eventually disappear in the earth. However, a representative number of these scattered fast neutrons will re-enter the borehole and strike the detector system, and if the detector is adapted to respond to incident fast neutrons, an accurate measurement may be obtained of the fast neutron population of the irradiated formations. Thus, if the formation is irradiated with only a very short burst of fast neutrons, a measurement of the decline rate of these fast neutrons in the formation will furnish a direct indication of the slowing effect had on fast neutrons by the formation nuclei.

On the other hand, fast neutrons decay to thermal energy quite rapidly irrespective of the nature of the irradiated substances. Thus, it is apparent that an accurate measurement of the lifetime or decline rate of fast neutrons necessitates the commencement of the detection interval during the neutron pulse, and the termination of the detection interval within a very short time after the termination of the output of the neutron source. In other words, the ideal measurement of the decline rate of fast neutrons must be commenced with the occurrence of the fast neutron population peak, and must be terminated immediately after the last fast neutron is thermalized.

The measurement of the decline of the thermal neutron population provides a means for determining a property of the material surrounding the borehole which is a definite, calculable, physical parameter, the macroscopic capture cross section of the formation.

A simple relationship exists between the measured "lifetime" of a formation and its chemical composition. To derive this relation, it is first necessary to define neutron lifetime. For this purpose it, is defined as L, the time required in a given medium for the total number of thermal neutrons existing at any instant to fall to half value. Thus L is a quantity which is analogous to the half life of radioactive materials.

Figure 2:
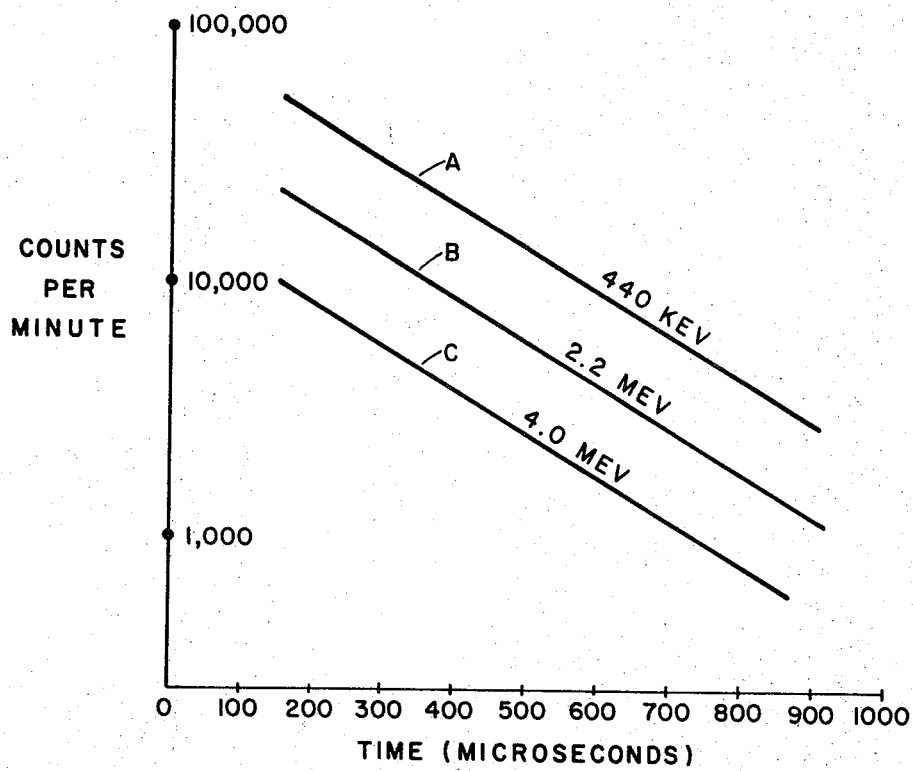
FIG. 2 is a schematic representation of curves representing the outputs from different pulse height discriminators according to the invention.

Just as with radioactive decay, the number of neutrons captured per unit time is proportional to the number of neutrons present. The total number of neutrons in the formation as a function of time can be expressed by a formula as follows:

$$N = N_0 e^{-\Sigma V T} \qquad (1)$$

Where N is the number of neutrons at any time T, $N_0$ is the number of neutrons at time T=0; V is the velocity of the neutrons and $\Sigma$ is the macroscopic capture cross section. $\Sigma$ differs for different formation materials, and can easily be calculated if the chemical composition is known. To demonstrate the above-described theory, tests have been run in various simulated boreholes. FIG. 2 of the drawings illustrates the observed radiation decay in a barrel of unconsolidated sand, saturated with fresh water. It should be appreciated that the decay is exponential and the counting rate falls to half its value in about 220 microseconds. Approximately the same decay rate is observed at all three of the discriminator settings a, b and c. Although the slopes have been illustrated as being approximately the same in FIG. 2, the slopes of different discriminator settings quite often are slightly different due to background radiation being detected particularly when the discriminator setting is low, which results from natural radioactivity and from long-lived neutron induced radiation in the crystal and in the formation. The background can be completely or substantially eliminated by setting the discriminator sufficiently high; but raising the discriminator value has the undesirable result that counting rates are reduced. Experimental results indicate that for most purposes the background is tolerable at any discriminator setting above about 400 kev.

In order to make a quantitative measurement of an unknown formation fluid in a logging operation, the slope of the radiation decay curve, for example like those in FIG. 2, must be determined. To do this, the logging instrument is arranged so that two separate measurements are made during each cycle, the first at a time $T_1$ after the neutron source pulse and the second at a later time $T_2$.

At times $T_1$ and $T_2$ the counting rates $N_1$ and $N_2$ are given by the following relation derived from Equation 1:

$$\ln \frac{N_2}{N_1} = -\Sigma V (T_2 - T_1)$$

If we take $T_2 - T_1$ equal to 600 microseconds, for example, then $$\ln \frac{N_2}{N_1} = -132 \Sigma$$

$$\frac{N_2}{N_1} = e^{-132\Sigma}$$

so in the case of the salt water sand where $\Sigma$ is computed to be .0269, $$\frac{N_2}{N_1} = e^{-3.55} = .029$$

but for the fresh water sand where $\Sigma = .0099$, $$\frac{N_2}{N_1} = e^{-1.29} = .275$$

In logging, the observed deflections of the two recorded curves are proportional to $N_1$ and $N_2$, respectively. If desired, the two curves may be normalized so that they produce equal log deflections in a fresh water sand. In the example given, it can be seen that the salt water sand would not produce equal deflections but two deflections differing by a factor $$\frac{.275}{.029} = 9.5$$

In other words, when logging through these two formations, the log response could be set up in one zone so as to give the same deflections for both curves, whereupon in the other zone, the two deflections would differ by 950%. An even bigger differential would result if the interval $T_2 - T_1$ were chosen larger, for example 900 microseconds, in which case the two curves would differ in the relative response to these particular zones per factor of 2,900%.

The technique described of comparing the relative counting rates in two separate gates during the quiescent period between pulses has been found to be a generally satisfactory means for a quantitative evaluation of the decline of the thermal neutron population. Depending on lithologic conditions, the duration and timing of the gates may be chosen in various ways to achieve the desired result.

The improvement according to the present invention in the above-described measurements comprises, broadly, a plurality of measurements made respectively with different discriminator settings taken during the first gating period. FIG. 3a illustrates a representative borehole 11 in the earth 10 wherein a plurality of formations such as the shaley sand with oil 31, the oil formation 32 and the salt water formation 33 are in layers. The curves shown in FIG. 3b are representative of the second gate curve 34 and a pair of curves 35 and 35′ which result from gamma rays detected within the first gate interval with the improvement that a pair of discriminator settings are used to produce the respective curves, which are accordingly differently responsive to variations in gamma ray energy spectra. It should be appreciated that the curves 35 and 35′ have been normalized in this case within the region of the oil bearing zone 32. The curve from the second gate 34 typically rises sharply at the oil bearing region 32 due to the fact that the clean sand, being substantially lacking in salt water, has a relatively long neutron lifetime, i.e., a relatively small Σ. Curves 35 and 35′, being normalized in the same region, allow convenient comparison with other zones where the interpretation of the fluid type is not certain because the type of reservoir rock is not definitely known and may be suspected to be shaley. In such case the measured Σ might be so high as to be normally interpreted as being salt water bearing when, in fact, it may be a shaley or "dirty" sand which is oil saturated. FIG. 3b shows that zone 33, which is water bearing, can then be distinguished from zone 31, which is oil bearing, by intercomparison of the response of curves 35 and 35′ in the respective zones. It will be noted that curve 35′ gives a relatively higher response than 35 in zone 33 whereas the converse is true in zone 31. This is due to the fact that in the case of a salt water sand there will be detected a relatively larger proportion of high energy gamma rays, namely those above 4 mev. on account of the presence of chlorine which, as previously stated, produces a preponderance of high energy gamma rays upon the capture of thermal neutrons. On the other hand, in a shale or shaley sand the preponderance of neutron capture is due to boron and hydrogen. Both of these elements produce relatively low energy gamma rays. If salt water is also present, an increased proportion of high energy gamma rays will be observed. In the example of FIG. 3b, zone 31 contains oil whcih will contribute primarily hydrogen capture gamma rays to those due to the boron and hydrogen of the shale and sand, along with the expected variety of capture radiations from silicon, calcium, iron and such other elements as may be present in the formation. Due to this relative absence of high energy gamma rays from either the oil or the shale component of the shaley sand, curve 35′ is relatively low in response relative to a known water sand or even, to a smaller degree, less than a known oil sand, and hence a comparison of curves 35 and 35′ permits recognition of zone 31 as an oil bearing zone rather than a salt water bearing zone.

Another spectral analysis of capture radiation has been previously proposed as a means for identifying various elements in nuclear logging, these methods have not been used with good commercial success because of the great complexity involved in both the instrumentation for making the measurements and in the difficulties of interpreting the results in relation to the presence or absence of oil.

The present invention is unique in that it avoids instrument complexity by employing in a large measure the same apparatus as is used to make the commercial Neutron Lifetime Log; and it provides a simple means for displaying and interpreting the results of the measurements so as to facilitate the identification of oil bearing zones by the use of an energy selective measuring system in combination with the Neutron Lifetime measureemnt.

In order to accomplish this, applicants have discovered and taken advantage of the fact that a preponderance of the neutron capture effect in many shales and in the shale component of shaley sand is due to the boron content of the mineral constituents along with the hydrogen content of the clay minerals. It has long been recognized that the clay mineral content of shales resulted in a high hydrogen content such that the conventional neutron-neutron log or neutron gamma log responds to such zones as if they were highly porous. Moreover, because a shaley sand may have a high boron content, the Neutron Lifetime Log may indicate that it has a high capture cross section such that it might be presumed high in chlorine content even though in fact it were oil bearing. In accordance with the present invention, such zones are recognized and their fluid content correctly deduced by the combined use of the Neutron Lifetime measurement and one or more additional curves obtained by simultaneously measuring the capture gamma radiation in a different portion of the spectrum from that measured to derive the thermal neutron capture cross section. Specifically and by way of illustration, the system has been described whereby a measurement of Σ is obtained by measurement of the gamma radiation above 2 mev. occurring in each of two gates respectively 400 to 600 microseconds after each neutron source pulse, and 700 to 900 microseconds after each pulse. Referring again to FIG. 3b, these two measurements are depicted by curves 35 and 34 respectively. Additionally, curve 35′ is produced by a measurement made during the same interval as curve 35, namely from 400 to 600 microseconds after each neutron source pulse. This latter measurement comprises in this embodiment only radiation above 4 mev. It will be immediately apparent that this measurement will be qualitatively similar to curve 35 in that curves 35 and 35′ tend to increase and decrease with one another as zones of various types are encountered while logging a series of formations. It will, on the other hand, be observed that such variations as do occur in the relative amplitudes of curves 35 and 35′ will be entirely due to variations in the chemical constituents of the rocks and their contained fluids, particularly the relative amounts of boron, hydrogen and chlorine. Of particular advantage is the fact that the fluids in and around the borehole will have no appreciable effect due to the fact that radiations from the borehole disappear largely during the 400 microsecond quiescent interval elapsing between the neutron source pulses and the measurement interval.

As described in copending application, the two curves 34 and 35 provide information whereby the thermal neutron capture cross section Σ of a formation may be calculated. Further, having thus determined Σ from the log, the proportion of water and oil respectively which occupy the pores of the rock can thereupon be calculated if "sigma rock," i.e., Σ rock, is known and if the salinity of any water which may be present is also known. It will be apparent that since both the rock and the water contribute to neutron capture if one is underestimated the other will be correspondingly underestimated. Thus, when a formation has been logged by the Neutron Lifetime Log and its Σ value determined, it remains generally impossible to determine the quantity of contained oil and water unless Σ rock is correctly estimated. In the past, this has been done wholly by experience, i.e., by measurements made on the same or similar formations in other wells or in the same well at other depths from the zone in question. The present invention provides a means to overcome this difficulty by making it possible to observe differences between zones which differences are independent of Σ. The most significant application relates to the recognitions of oil bearing shaley or dirty sands. This is true because actual examples have been observed in commercial operations wherein a shaley oil sand has been logged and where the log response was such that a qualified log interpretation specialist would incorrectly conclude that the sand contained only water. By thus condemning a zone which in fact was known to contain oil, had such knowledge not already been available, an oil reservoir of enoromus value might have been overlooked and abandoned.

With the additional curve 35' as herein described, such would not occur. Since the shale fraction of the shaley sand contains both hydrogen and boron, neither of which produces gamma rays above 4 mev., the response of curve 35' relative to curve 35 will be less in zone 31 than in zone 33. Moreover, it is obviously also less than it would be if part of its contained oil were displaced by salt water, which change would not appreciably alter either the boron content or the hydrogen content but would increase the chlorine content, with a consequent increase in the response of curve 35' relative to 35.

FIG. 4 illustrates in block diagram the circuitry which can be utilized for providing a plurality of pulse height discriminators within the first gate of the log herein described. A first crystal 41, for example CsI or NaI can be used as a scintillation crystal. LiI, a neutron detector, is also acceptable. For purposes of this apparatus and circuitry, however, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon.

The light emitted by most scintillators is generally very feeble and the resulting signal must be amplified in order to account for a detectable parameter. To accomplish such amplification, a photomultiplier tube 42 is incorporated. Photomultiplier tubes are available in a variety of types which may be used for the purpose stated. The output of the photomulitplier tube is applied to the input of the preamplifier 43. The preamplifier may be of any conventional design. The output of the preamplifier is fed to the input of the discriminator 44 which has been set to respond to pulses of a preselected magnitude. These pulses pass to gate 1, element 45, and gate 2, element 46. Those pulses falling within the respective gates pass to rate meters 73 and 76, respectively, and the resultant indication of pulse rate is recorded in a conventional manner as two continuous curves in correlation with depth of the logging instrument, for example, curves 34 and 35 of FIG. 3b. Circuits employed for this purpose may be of any suitable design well known to those skilled in the art. A second crystal 48, for example, like crystal 41, is set to be receptive to gamma ray photons during an interval coincident with gate 1. The photomultiplier 49 is coupled through a preamp stage 50 to discriminator 51, which is set to respond to pulses of a preselected amplitude different from discriminator 44. The signal which is passed by discriminator 51 and gate 74 passes to rate meter 75 which produces a curve such as curve 35' in FIG. 3b, labeled as being indicative of radiation having energies above 4 mev. Thus, pulses produced by gamma rays detected by crystal 41 are sorted as to energy by discriminator 44 which may, for example, be set to pass all pulses having energies above about 2 mev. Those pulses passed by the discriminator 44 are further separated as to those which fall within gate 1, for example 400 to 600 microseconds after the neutron source pulse, and those that fall within gate 2, for example 700 to 900 microseconds after the pulse. Simultaneously, pulses produced by gamma rays detected by crystal 48 are sorted as to energy by discriminator 51 which is set to respond only to pulses which have a preselected energy or range of energies. Those pulses passed by the discriminator are further sorted as to whether or not they fall within gate 3 (which is set to be the same as gate 1), and those falling within the gate comprise the recorded curve.

As previously explained, discriminator 51 is set to respond to pulses corresponding to different energies than those passed by discriminator 44. In one embodiment, discriminator 51 is set higher than discriminator 44; in another embodiment, it is set lower. In general, it is preferred that the crystal employing the lower discriminator be the more remote from the neutron source in order to compensate for the fact that its greater distance would otherwise cause a reduced counting rate. Additionally, it may be beneficial to have one or both of the discriminators set to pass only a particular band or bands of pulse heights to respond with particular sensitivity to gamma rays indicative of neutron capture by specific earth elements.

FIG. 5 illustrates an alternative embodiment of the portion 52, shown in dotted lines, of FIG. 4. The rate meters 73 and 75 (illustrated in FIG. 4) are coupled into a ratio detector 53 which is coupled into the recorder 47 to provide a single curve indicative of the ratio of the two output pulses from the discriminators 51 and 44 falling within gates 1 and 3, together with the curve from the second gate as described with respect to FIG. 4.

FIG. 6 illustrates an alternative embodiment of the invention wherein a single crystal 61 is coupled into photomultiplier 62, through a preamp 63, and into a conventional gating system 64. The timing pulses into the gating system 64 are provided from the timing of the neutron source such that the gate 64 passes the signals representative of the radiation received by the crystal 61 through the output 71 during one part of the cycle and through the output 72 through another part of the timing cycle following each neutron burst. In this embodiment, the outputs from 71 correspond to the first gate of the cycle following the transmitted pulse and output 72 corresponds to the second gate during the cycle following the neutron pulse. The output of the mixer 65 is coupled into a pair of discriminators 66 and 67 into the recorder 68 through conventional counting rate meters (not illustrated). Likewise, amplifier 69 is coupled into the recorder 68 through a conventional rate meter (not illustrated). It should be appreciated, therefore, that FIG. 6 illustrates an embodiment wherein a single crystal can be used to provide similar information to that of FIG. 4 without the use of the two crystals 41 and 48 described therewith. Although not illustrated, the ratio detector means 53 as illustrated in FIG. 5 could also be used with the embodiment as illustrated in FIG. 6, being placed between the discriminators 66 and 67 and the recorder 68.

It should be appreciated that there has been described herein a radioactivity well logging apparatus and method for measuring the decline of the thermal neutron population in a formation wherein a pair of gates are used to detect either the gamma ray photons or the thermal neutrons per se and being characterized by a plurality of discriminator settings within one of the gating intervals. There has also been described an apparatus for determining the ratio of the outputs of a pair of discriminators used during one of the gating intervals.

The discriminator settings are based upon the characteristic behavior of a nucleus upon capture of a neutron. The degree of excitation of a compound nucleus depends upon the identity of the original nucleus that captured the neutron. Hydrogen, upon neutron capture, produces a compound nucleus having an excitation energy of about 2.2 mev. and emits a single photon of that energy. However, all compound nuclei do not lose the energy resulting from neutron capture in the same way. In the case of a heavy nucleus, the excitation energy may be lost in a single step or it may be lost in the form of several quanta emitted substantially simultaneously. In order to consider the behavior of a heavy nucleus not having a one-step decay, consider an exemplary atom which has a nucleus that upon capture of a neutron has an excitation energy of 7 mev. This compound nucleus may decay first to an intermediate energy state wherein the nucleus has an excitation energy of 4 mev. and, as a result, a gamma ray of 3 mev. energy emerges from the nucleus. Subsequently, the nucleus may decay further to an energy state wherein it has an excitation energy of 0 mev. in which process a photon emerges having an energy of 4 mev. The process may result in any series of photons of different energies up to a maximum equal to the excitation energy, and it should be understood that this example is only presented for illustrative purposes. However, it is known that if the photons which result from such decays are detected, one may obtain for each element a gamma ray energy spectrum. The spectrum is indicative of the nuclear species having such a decaying nucleus. For purposes of this invention, it is important to note that the most prominent photon energies resulting from chlorine capture are between 3.5 and 7 mev. and the photons resulting from hydrogen capture have an energy of approximately 2.2 mev.

Because of the fact that chlorine photons resulting from a decay subsequent to capture have an energy greater than those of photons resulting from hydrogen decay subsequent to capture and these are, in turn, more energetic than those from boron which has an energy of .45 mev., the discriminators can be set so that the measurement includes or excludes the desired information. For example, if one differential discriminator is set at approximately 0.4–1.0 mev., hydrogen photons will be excluded, whereas the boron capture photons will be included, and if an integral discriminator is set at approximately 2.0 mev. the hydrogen photons will be included and the boron photons will be excluded. Likewise, an integral discriminator can be set at approximately .4 mev. and include both the boron and hydrogen-excited nuclei. The chlorine excited photons have a spectral range from 0 to 8 mev., a major portion of which falls within the range 4 to 8 mev., with a maximum being around 5 to 6 mev. Thus, an integral discriminator set at 4 mev. would be particularly responsive to chlorine emitted photons to the exclusion of these from hydrogen and boron nuclei.

It should be appreciated that while the crystals 41 and 48 of the detection system 13 are necessarily located within the downhole tool 12, the discriminators 44 and 51 could be either within the downhole tool or could be associated with circuitry above the surface of the earth, shown generally as amplifier 19 in FIG. 1 or thereabouts. Thus, if desired, the entire radiation signal detected during the first gating interval could be set to the surface before being applied to the circuit providing discrimination thereof.

Figure 3:
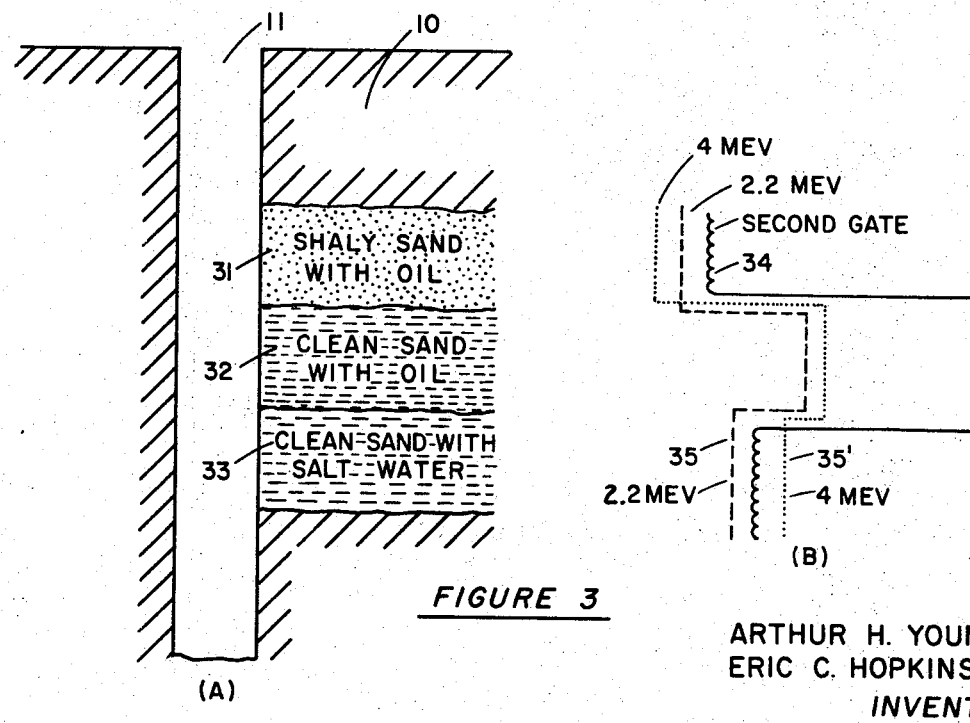

In practicing the method according to the present invention within one embodiment hereof, the operator may adjust the amplification circuits associated with the two rate meters or the recorder to provide a normalized curve within any given region being logged, for example, when the tool is within a known oil bearing region such as layer 32 of FIG. 3. The two curves 35 and 35' are normalized or made to lie substantially one upon the other, thus facilitating the intercomparison of zones and providing valuable corroboration to the method afordescribed with respect to the decline of the thermal neutron population following irradiation of the formation with high energy neutrons. Although a preferred embodiment would provide for the oil region curves to be normalized, it should be appreciated by those skilled in the art that normalizing in other regions, for example in the salt water region 33, also would facilitate intercomparison of the several zones and would provide valuable information to the logging operator.

In practicing another embodiment of the invention as shown in FIG. 5, wherein means are provided for indicating a ratio of the two pulse height discriminators, an analogy is readily apparent between the ratio being a given number and the normalization of the curves as demonstrated in FIG. 3b.

It has been found that good results are achieved using one of the discriminators set at 2.0 mev., approximately the energy of hydrogen capture gamma rays and another of the discriminators set at 4 mev. which detects a substantial amount of the chlorine capture gamma rays. Likewise, it has been found that one of the discriminators set at approximately .4 mev. provides an indication of the boron capture while the other discriminator set at approximately 1.8 or 2.0 mev. provides an indication of hydrogen capture. Thus it should be appreciated that the two discriminators provide corroboration with the logging of the decline of the thermal neutron population, the discriminators being especttially helpful to provide variations in the relative hydrogen-to-chlorine ratio, the boron-to-hydrogen ratio, or the ratio of chlorine to boron plus hydrogen.

Although these examples employ simple discriminators for simplicity, it should be appreciated that a differential discriminator, i.e., a pulse height analyzer may be used to provide still more definitive indications of the relative abundance of the respective capturing elements. In such case, the differential discriminator would be set to select only those pulses falling within the particular energy range representative of the gamma rays sought to be detected as an indication of the particular respective elements.

Modifications of this invention other than these herein suggested will become apparent to those of ordinary skill in the art after reading this disclosure. For example, although not illustrated, the curve $\Sigma$, which essentially represents the slope of the line which is the ratio of the radiation received within the two gating intervals without regard to the dual discriminator settings, could also be used with the other curves herein described. Likewise, while the preferred embodiments have a pair of pulse height discriminators, it should be appreciated that a person skilled in the art might use three or more such discriminators. Therefore, it is intended that the matter contained in the foregoing description and the accompanying drawings be interpreted in an illustrative sense, and not in a limiting sense, when consideration is given to the appended claims.

What is claimed is:

1. Apparatus for radioactivity well logging comprising a source of neutrons, a radiation detector arranged in a trailing relationship to said source, gating means connected to said radiation detector having first and second outputs, means for causing said source to produce a discrete burst of neutrons and for triggering said gating means to provide an indication functionally representative of the rate of decline of at least a portion of said neutrons in a medium, a plurality of pulse height discriminators connected to said first output, and recording means interconnected with said discriminators and said second output.

2. The apparatus according to claim 1 wherein said plurality of pulse height discriminators are each connected to individual inputs of said recording means.

3. The apparatus according to claim 2 wherein said plurality comprises two.

4. The apparatus according to claim 3 comprising in addition thereto, ratio detector means for obtaining the ratio of the outputs of said two discriminators, said ratio detector means having an output which is connected to said recording means.

5. A system for radioactivity well logging comprising:
(A) a borehole apparatus comprising a source of neutrons, a radiation detector arranged in a trailing relationship to said source, gating means connected to said radiation detector having first and second outputs, means for causing said source to produce a discrete burst of neutrons and for triggering said gating means to provide an indication functionally representative of the rate of decline of at least a portion of said neutrons in a medium;

(B) means for transporting the outputs of said gating means to the earth's surface; and (C) surface equipment comprising a plurality of pulse height discriminators connected to the first output of said gating means, and recorder means interconnected with said discriminators and said second output of said gating means.

6. The system according to claim 5 wherein said plurality of pulse height discriminators are each connected to individual inputs of said recording means.

7. The system according to claim 6 wherein said plurality comprises two.

8. The system according to claim 7 comprising in addition thereto, ratio detector means within the surface equipment for obtaining the ratio of the outputs of said two discriminators, said ratio detector means having an output which is connected to said recording means.

9. A system for radioactivity well logging comprising a source of neutrons, radiation detector means arranged in a trailing relationship to said source having first and second outputs, means for causing said source to produce a discrcete burst of neutrons and for gating said detection means to provide an indication functionally representative of the rate of decline of at least a portion of said neutrons in a medium, a plurality of pulse height discriminators connected to said first output of said detector means, and recording means interconnected with said discriminators and said second output of said detector means.

10. A method of well logging comprising the steps of irradiating the earth formations surrounding the borehole with a pulse of fast neutrons, detecting radiations occasioned in said formations by said pulse during a first time interval following the absorption of substantially all neutrons in said borehole, detecting radiations occasioned in said formations by said pulse during a second time interval following said first time interval, functionally separating said radiations detected during said first time interval based upon pulse height discrimination into first and second radiations, deriving an electrical signal indicative of each of said first and second separated radiations and an electrical signal indicative of the radiations detected during said second time interval, and recording said signals with a correlative indication of depth in said borehole.

11. The method according to claim 10 comprising the additional step of obtaining the ratio of the electrical signals indicative of said first and second radiations and recording an electrical signal indicative of said ratio along with the signal indicative of the radiation received during said second interval.

12. The method according to claim 10 wherein said recording step comprises normalizing the electrical signals indicative of said separated radiations.

References Cited
UNITED STATES PATENTS

| | | | |
|---|---|---|---|
| 2,991,364 | 7/1961 | Goodman | 250—83.3 |
| 3,379,882 | 4/1968 | Youmans | 250—83.3 |
| 3,379,884 | 4/1968 | Youmans | 250—83.3 |

ARCHIE R. BORCHELT, Primary Examiner

U.S. Cl. X.R.

250—71.5, 83.6